United States Patent [19]
O'Dea et al.
[11] 3,875,346
[45] Apr. 1, 1975

[54] REVERTIVE PULSING

[75] Inventors: Orrin B. O'Dea, Garden Grove, Calif.; Philip Johnson, Hoffman Estates, Ill.; Ralph Morrison, Pasadena, Calif.

[73] Assignee: Communication Mfg. Co., Long Beach, Calif.

[22] Filed: Feb. 25, 1974

[21] Appl. No.: 445,648

[52] U.S. Cl. .......... 179/18 E, 179/18 AH
[51] Int. Cl. .......... H04m 7/12
[58] Field of Search .......... 179/18 AH, 18 E, 16 A, 179/16 AA, 17 D

[56] References Cited

UNITED STATES PATENTS 1,830,935 10/1931 Deakin et al. .......... 179/18 E
2,864,079 12/1958 Anderson .......... 179/16 A

*Primary Examiner*—William C. Cooper
*Assistant Examiner*—Randall P. Myers
*Attorney, Agent, or Firm*—Christie, Parker & Hale

[57] ABSTRACT

A sending telephone central office has tip and ring conductors carrying revertive pulses transmitted thereto from a terminating central office during a revertive pulsing operation. Triggerable solid state digital circuitry detects when equality is reached between the number of revertive pulses so transmitted during the operation and the number of desired pulses in a previously registered digit. There is provided apparatus operative in response to each such revertive pulse to produce a clock pulse suitable to trigger the solid state digital circuitry.

6 Claims, 2 Drawing Figures

REVERTIVE PULSING

BACKGROUND OF THE INVENTION

This invention relates to revertive pulsing systems.

Revertive pulsing systems have long been used as part of telephone switching systems that provide for establishing a connection between two telephones including those which are serviced by separate telephone central offices.

In a revertive pulsing system, one of the central offices (called the sending central office) initially performs a variety of tasks such as detecting an off-hook condition, providing a dial tone signal, receiving signals such as multi-frequency tones or dial pulses from the calling telephone, and the like. Thereafter, the sending central office signals a demand for service from the other central office (called the terminating central office). In response, the terminating central office starts to generate a succession of pulses and continues to do so until it receives a signal indicating that it should stop.

The generated pulses are used in the terminating central office in substantially the same manner as dial pulses. That is, they are used therein to control switching circuitry so as to select a called telephone and provide ringing voltage to it. In addition, these generated pulses are transmitted to the sending central office where they appear as revertive pulses on tip and ring conductors. In the sending central office, there is provided an arrangement for monitoring the tip and ring conductors to detect the revertive pulses and to signal completion of the revertive pulsing operation when equality is reached between the number of revertive pulses so transmitted and the number of desired pulses in a previously registered digit.

Heretofore revertive pulsing arrangements have been constructed from banks of electromechanical relays. Such relays have several disadvantages. They are bulky; they require fairly substantial operating currents and therefore consume a considerable amount of power; and they have a limited useful life. Certain advantages that they offer, however, have led to the continued use of relays. For example, the relay coil can be direct current isolated from the relay switching contacts. This is an important feature because it is necessary to telephone switching systems to maintain such direct current isolation as between the batteries of two different central offices. As another example, a relay, because of the inductance of its coil, the inertia of its switching contacts and other factors, does not respond to such noise effects as contact switching chatter.

In the part of the reverting pulsing arrangement that monitors the tip and ring conductors there is an additional problem that attends the use of relays. The revertive pulses that are carried by these conductors incident to transmission from a remote central office are used to energize and deenergize a relay commonly called a sender STP relay. The distance separating central offices is not the same in every case, and, as a result, the loop impedance is not the same. In the design of the sender STP relay circuit this loop impedance must be taken into account. This is so because of several factors. To begin with, the STP relay must be capable of cyclical operation at a relatively high rate for a relay. This in turn requires careful control to ensure proper levels of operating and release currents for the relay coil. The approach taken to ensure this has been to insert compromise compensating resistors in an attempt to optimize transmission.

For this and other reasons, a substantial maintenance program is necessary to ensure proper functioning of the sender STP relay.

SUMMARY OF THE INVENTION

The present invention eliminates the above-described problem as to the need for compensating resistors and provides improved performance in comparison with existing revertive pulsing systems.

The present invention is embodied in an arrangement for monitoring tip and ring telephone conductors in a sending central office to detect and signal completion of a revertive pulsing operation. During a revertive pulsing operation, one or more successively occurring revertive pulses are serially carried by the tip and ring conductors. These revertive pulses are transmitted thereto from a terminating central office until the completion signal is provided. The completion signal is generated when equality is reached between the number of such revertive pulses and a registered number indicative of a called digit. So as to be compatible with other existing equipment, preferably, there are provided buffer circuits that accept input signals in the conventional telephone relay make/break format from relays whose switching contacts indicate the registered number. The buffer circuits provide output signals that are compatible with solid state digital circuitry used to detect equality.

The invention provides apparatus operative in response to each such revertive pulse to produce a clock pulse suitable to trigger the solid state digital circuitry. This apparatus includes a terminating resistance switchably connected between the tip and ring conductors so as to complete, for the duration of the revertive pulsing operation, a loop for conducting current flowing incident to the revertive pulses. Preferably, normally closed switching contacts of a relay switchably connect one end of the terminating resistance to one of the conductors. When this relay is energized, these switching contacts open and thereby open the loop by disconnecting the terminating resistance. The opening of the loop serves to signal the terminating central office that the revertive pulsing operation is complete.

The apparatus further includes a diode bridge circuit having a pair of input nodes each of which is connected to an opposite end of the terminating resistance. The bridge has a pair of output nodes between which unidirectional current can flow irrespective of the direction of the loop current. This is an important feature because there are circumstances in telephone switching system operation where reverse voltage is used for signaling.

Significantly, there is provided an optical-coupler device comprising an input optical-coupler diode and an output optical-coupler transistor. The optical-coupler diode is connected in series-circuit relationship between the pair of bridge nodes so that the revertive pulses cause pulses of unidirectional current to flow through the optical-coupler diode. The optical-coupler transistor switches in a cycle, from a non-conductive condition to a conductive condition and back, in response to each such pulse of current. An important feature of the optical-coupler device is that there is no direct current connection between its input and output. Thus the device provides direct current isolation as between batteries of separate central offices.

In the preferred embodiment, there is provided voltage limiting means such as a series of diodes that are connected between the pair of bridge output nodes so as to be in parallel-circuit relationship with the optical-coupler diode. The voltage limiting means, together with a current-limiting element that is preferably connected in series with the optical-coupler diode, ensures that current pulses flowing through the optical-coupler diode are regulated as to their amplitude. Thus, notwithstanding the above-described problem arising from the substantial differences that exist in loop impedances, substantially uniform performance is obtained without the requirement for compensating resistance adjustment as was common in prior art equipment. Moreover, this feature ensures that the current pulses do not exceed the maximum allowable current rating of the optical-coupler diode, thereby protecting it against damage.

A pulse shaping circuit responds to the cyclical switching of the optical-coupler transistor so as to produce one of the clock pulses per revertive pulse. Advantageously, the pulse shaping circuit includes a chatter-rejection circuit comprising a threshold detecting circuit and a time delay network coupled between the optical-coupler device and the threshold detecting circuit. When chatter noise, such as is caused by relay bouncing, causes the optical-coupler transistor to go through a relatively short-duration cycle, the delay introduced by the time delay circuit precludes the threshold detector from responding to the chatter noise.

As to the solid state digital circuitry, advantageously, it is constructed from C-MOS integrated circuit chips. The C-MOS circuitry provides superior noise-rejection operation, this being particularly significant in the noisy environment of a telephone central office.

DETAILED DESCRIPTION

Figure 1:
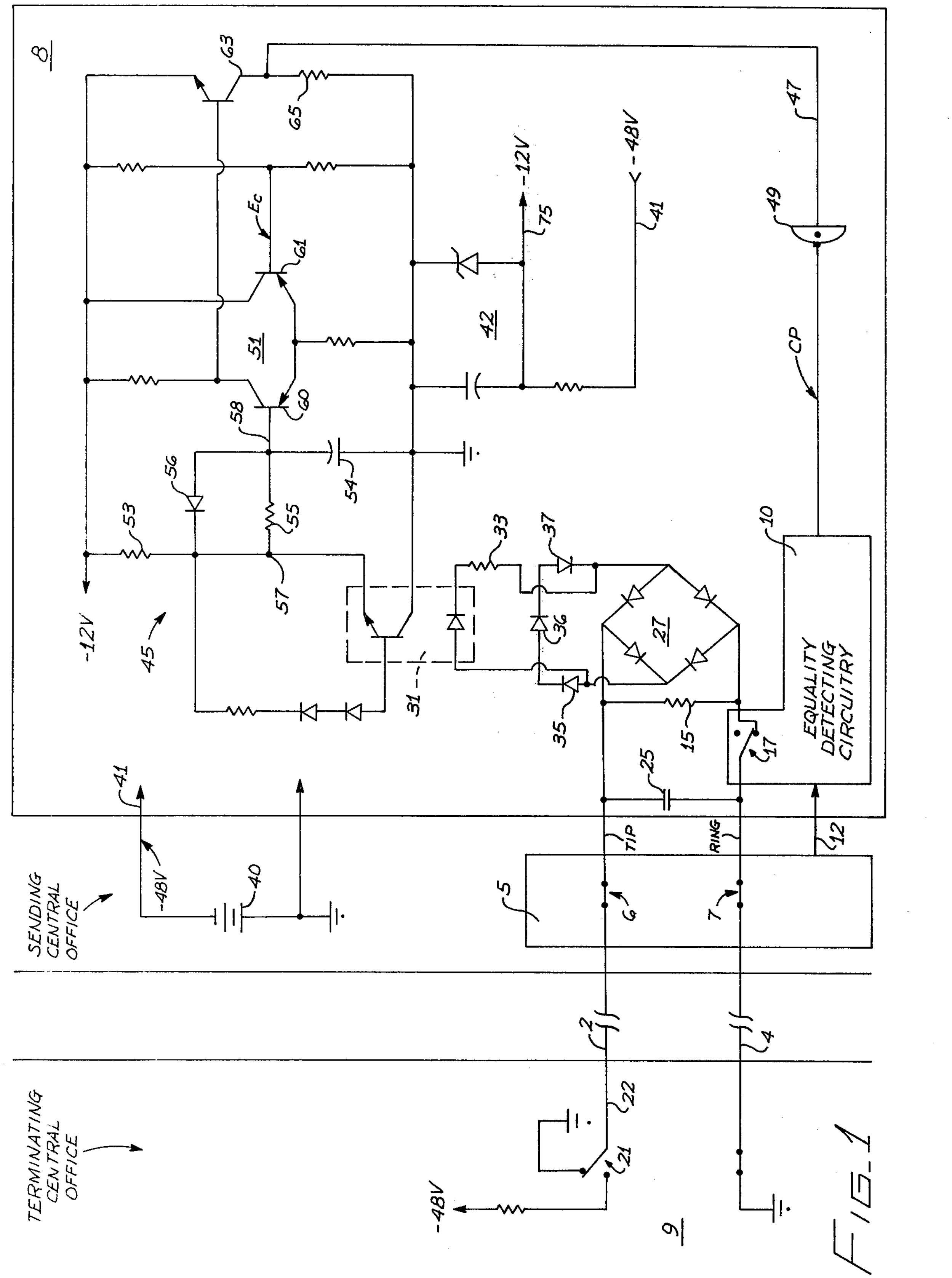
FIG. 1 is a block and schematic diagram showing in general an overall revertive pulsing system including sending and terminating telephone central offices, and showing in detail the clock pulse producing apparatus of this invention.

In FIG. 1 there are shown those parts of a sending telephone central office and a terminating telephone central office that are pertinent to the present invention.

The central offices are connected together in the conventional manner by telephone transmission wires 2 and 4 and by repeaters and the like (not shown) where necessary for amplification.

When a telephone (not shown) that is connected by a subscriber loop to the sending central office is used to place a call to a telephone serviced by the terminating central office, conventional relay and stepping switch circuitry 5 in the sending central office initially performs a variety of tasks such as detecting the off-hook condition and providing a dial tone to the calling telephone.

The circuitry 5 also receives coded signals which may for example be multi-frequency tones or dial pulses from the calling telephone and responsive thereto decodes the code indicating what terminating central office will be involved in the particular call. For purposes of brevity, hereinafter in this description, the coded signals will be referred to as dial pulses, but it should be borne in mind that other forms of pulsing can be used.

Switches 6 and 7 are shown within circuitry 5 as representative of the switching circuitry that effects a connection between the transmission wires 2 and 4 and a monitoring arrangement 8.

The last four dialed digits identify a specific one of the telephones serviced by the terminating central office. In accordance with revertive pulsing techniques the individual dial pulses of these four digits are not transmitted to the terminating central office. Instead, the sending central office signals a demand for service from the terminating central office. In response, the terminating central office starts to generate a succession of pulses and continues to do so until it receives a signal indicating that it should stop. A representative arrangement for generating the pulses is indicated generally at 9.

As to each of the last four dialed digits, the circuitry 5 provides data and control inputs to equality detecting circuitry 10. These data and control inputs are carried by the signal leads (not individually shown in FIg. 1) of a bus 12.

The monitoring arrangement 8 includes a terminating resistance 15 that is switchably connected to tip and ring conductors that are monitored. Normally closed contacts 17 of a relay 19 (FIG. 2) effect this connection. With contacts 17 being closed and with switches 6 and 7 being closed, the terminating resistance completes a loop for current flow. The terminating central office by conventional means (not shown) recognizes the completion of this loop as a demand for service. When the relay 19 is energized, the switching contacts 17 open and thereby open the loop by disconnecting the terminating resistance 15. The opening of this loop serves to signal the terminating central office that the revertive pulsing operation for a given dialed digit is complete.

The representative arrangement 9 in the terminating central office includes means, schematically represented by a single-pole, double-throw switch 21, for switching the facility tip conductor 22 either directly to the facility ground or resistively to receive −48 volts from the facility battery (not shown). (In typical practice, this switching is effected by the operation of a vertically movable elevator rod and a commutator segment). During the revertive pulsing operation, the facility ring conductor is maintained at ground potential (i.e., 0 volts).

The switch 21 is successively opened and closed so as to generate pulses. Each pulse has a "make" phase and a "break" phase. During the make phase, the tip conductor is coupled to −48 volts and during the break phase it is connected to ground. Typically, the make phase lasts at least about 10 milliseconds (ms), and the break phase lasts at least about 12 ms.

The pulses generated by the arrangement 9 are used in the terminating central office in substantially the same manner as dial pulses. That is, they are used to control conventional switching circuitry (not shown) so as to select the called telephone. The generated pulses are also transmitted to the sending central office where they appear as revertive pulses on the tip and ring conductors.

The revertive pulses are very noisy in most cases. Among other things, there is a considerable amount of noise chatter associated with each pulse, this being the result of bouncing contact incident to relay operation. To smooth out some of this noise, there is advantageously provided a capacitor 25 connected between the tip and ring conductors. The normally closed switch 17 switchably connects the capacitor in parallel with the terminating resistance 15.

A diode bridge circuit 27 has a pair of input nodes each of which is connected to an opposite end of the terminating resistance. The bridge has a pair of output nodes between which unidirectional current can flow irrespective of the direction of loop current.

There is provided an optical-coupler device 31 comprising an input optical-coupler diode and an output optical-coupler transistor. The optical-coupler diode is connected in series-circuit relationship between the pair of bridge output nodes, whereby unidirectional pulses of current flow through it incident to a revertive pulsing operation. Advantageously the optical-coupler diode is connected in series with a current-limiting element such as a resistor 33 which among other things, ensures that the current flowing therethrough does not exceed the current carrying rating of the optical-coupler diode.

Further for protecting against damaging the optical-coupler diode, there is provided voltage limiting means that in the preferred embodiment comprises a series of diodes 35, 36, and 37. The voltage limiting means is connected between the pair of bridge output nodes.

Significantly, the voltage limiting means together with the current limiting element, ensures that current pulses flowing through the optical-coupler diode are regulated as to their amplitude. As a result, substantially uniform performance is obtained over a wide range of loop impedance.

The optical-coupler transistor is switchable between conducting and non-conducting conditions. It switches into conduction whenever current flows through the optical-coupler diode. An important feature of the optical-coupler device is that there is no direct current connection between its input and output. Thus, the device provides direct current isolation as between the sending office battery 40 and the voltage supply for the generation of the revertive pulses.

The central office battery 40 has its positive terminal connected to the local ground and its negative terminal connected to a lead 41 that provides operating power (i.e., −48 volts) to the arrangement 8. A voltage regulator circuit (indicated generally at 42) receives the −48 volts and provides −12 volts as power for various circuits in the arrangement 8.

Among these various circuits is a pulse shaping circuit indicated generally at 45. The pulse shaping circuit drives a signal lead 47 connecting it to a solid state digital circuit that advantageously is a C-MOS type NAND gate 49.

The pulse shaping circuit includes a chatter-rejection circuit comprising a threshold detecting circuit (indicated generally at 51) and a time delay network coupled between the threshold detecting circuit 51 and the optical-coupler device.

The time delay network includes a resistor 53, one end of which has −12 volts applied to it; a capacitor 54, one end of which is connected to ground (i.e., 0 volts); a resistor 55 that is connected in series between the resistor 53 and the capacitor 54, and a diode 56 that is connected in parallel with the resistor 54. The cathode of the diode 56 is connected to a node 57 that serves as an input node of the time delay network, and the anode of the diode 56 is connected to a node 58 that serves as an output node of the time delay network.

The threshold detecting circuit includes transistors 60 and 61 that are arranged in differential amplifier connection. The base electrode of the transistor 61 has applied to it a threshold-setting voltage Ec provided by a resistor divider network. The base electrode of the transistor is connected to the output node (58) of the time delay circuit. Owing to the differential amplifier arrangement, the transistor 60 will not conduct (i.e., it is reverse-biased) unless the voltage level at the node 58 is more negative than the threshold-setting voltage Ec.

A transistor 63 has its base electrode connected to the collector electrode of the transistor 60. The collector of the transistor 63 is connected to the signal lead 47 and also to a pull-down resistor 65. When the transistor 60 is reverse-biased the transistor 63 is too, the voltage level presented to the signal lead 47 thereby being pulled to ground through the pull-down resistor 65. When the transistor 60 is forward-biased it provides base current to the transistor 63 thereby turning it on so that it presents −12 volts to the signal lead 47.

The operation of what has so far been described is as follows. For an interval of time before the start of the break phase of the first pulse generated at the terminating central office, current flows in the completed loop. Some of this current flows through the optical-coupler diode and as a result the optical-coupler transistor is in a conductive condition. In this condition, the optical-coupler transistor shorts or clamps the node 57 to ground. With the node 57 being clamped to ground for this interval of time, it is assured that the capacitor 54 is fully discharged whereby the voltage level at node 58 is also ground. This being so, transistors 60 and 63 are non-conductive. Accordingly, the signal level presented to the signal lead 47 is pulled to ground through the pull-down resistor 65. NAND gate 49 recognizes this ground voltage level as a logical true or binary '1' level and, accordingly, its output signal CP is at this time at the binary '0' level.

At the start of the break phase, there is typically some contact bouncing that leads to chatter noise. The optical-coupler device follows this chatter noise, but the pulse shaper circuit does not. This is so because, for a short duration cycle of switching of the optical-coupler transistor there is insufficient time for the voltage level at the node 58 to pass the threshold voltage.

During the break phase, a stable condition is eventually reached in which the optical-coupler transistor does not conduct. With the optical-coupler transistor being switched out of conduction, the node 57 is no longer clamped and charging current is thereby directed to the capacitor 54 for a sufficient length of time for the voltage level at the node 58 to pass the threshold. As it passes the threshold, transistors 60 and 63 switch into conduction and the voltage level presented to the signal lead 47 thereby changes to −12 volts. NAND gate 49 recognizes this voltage level as a logical false or binary '0' level and, accordingly its output signal CP at this time changes to the binary '1' level. As will be described below with reference to FIG. 2, this leading edge or '0' to '1' transition causes a change in state of various digital circuits in the circuitry 10.

At the end of the break phase, there again is typically some contact bouncing that leads to chatter noise. By the end of the break phase, however, the capacitor 54 has been charged sufficiently to keep transistor 60 conductive even though the optical-coupler transistor follows the chatter noise and alternately clamps and unclamps the node 57. Here, as well, there is eventually reached a stable condition leading to the switching of the CP back to the 0 logical level.

The diode 56 plays an important role in connection with the chatter rejection. As a result of its non-linear characteristic, it influences the time constant of the time delay network of which it is a part differently depending upon the polarity of the voltage between nodes 57 and 58. When node 57 is at a more negative voltage level than node 58, the diode 56 is forward biased. Apart from second order effects such as offset voltage and the like, forward biasing the diode 56 in effect short-circuits the nodes 57 and 58 together. When the node 57 is at a more positive level than node 58, the diode 56 is reverse biased. Being reverse-biased, its impedance for practical purposes is infinite.

The foregoing characteristics lead to the following operational effects. Incident to the chatter noise at the start of the break phase, the optical-coupler transistor switches alternately between conductive and non-conductive conditions at a relatively high rate. During each of these non-conductive conditions, the diode 56 is forward biased and some charging current is directed to the capacitor 54, the time constant here being determined by the resistor 53 and the capacitor 54. During each of these conductive conditions, the diode 56 is reverse biased and whatever voltage has developed across the capacitor 54 is discharged at a rate determined by the time constant of resistor 55 and the capacitor 54. With appropriate values being selected for the elements of the time delay network, the repeating cycles of chatter noise lead to a progressively increasing voltage across the capacitor 54. In the presently preferred embodiment, these values are 120K ohms for each of resistors 53 and 55 and 0.1 $\mu$F for capacitor 54. Owing in part to this progressively increasing voltage, the chatter noise can occur for a substantial portion of the phase, and yet the pulse shaping circuit will not only reject this noise but still respond to the true signal.

Figure 2:
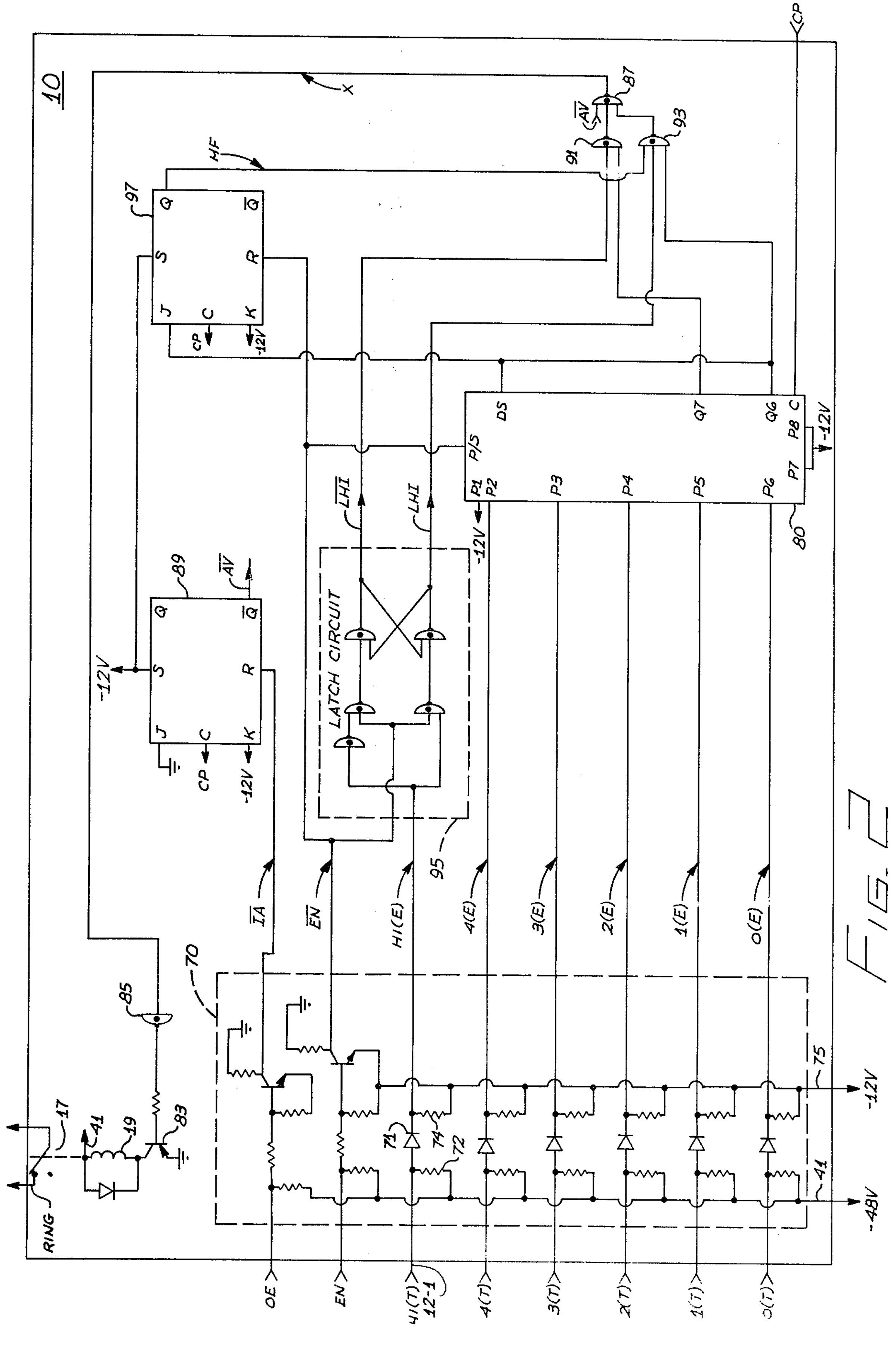
FIG. 2 is a block and schematic diagram showing the equality detecting circuitry of FIG. 1 in more detail.

FIG. 2 shows the equality detecting circuitry 10 in more detail. The individual signal leads of the bus 12 (FIG. 1) are shown, each being connected to a respective one of a group of buffer circuits 70.

As was described above, conventional telephone company equipment within the circuitry 5 (FIG. 1) applies data and control inputs to the signal leads of the bus 12. Each of these data and control inputs has the conventional telephone relay make/break format. In this format, a signal "goes to make" when a switch is closed to ground the lead carrying the signal; and, during a "break," the switch opens. Each of the buffer circuits responds to signals in this format to provide signals that are compatible with other solid state digital circuitry.

One of the control inputs is a signal EN. As to each dialed digit, the EN signal goes to make, this indicating to the circuitry 10 that data inputs are to be accepted. The individual data inputs are identified as HI(T), 4(T), 3(T), 2(T), 1(T), and 0(T); and, the corresponding buffered signals are identified as HI(E), 4(E), 3(E), 2(E), 1(E), and 0(E). In parallel, the data inputs define a code indicating the number of dial pulses in a previously dialed digit. Table I below is in the nature of a truth table for this code; in the table M represents make and B represents break.

TABLE I

| Data Inputs | | | | | | No. of pulses in previously dialed digit |
|---|---|---|---|---|---|---|
| HI(T) | 4(T) | 3(T) | 2(T) | 1(T) | 0(T) | |
| B | B | B | B | B | M | 1 |
| B | B | B | B | M | B | 2 |
| B | B | B | M | B | B | 3 |
| B | B | M | B | B | B | 4 |
| B | M | B | B | B | B | 5 |
| M | B | B | B | B | M | 6 |
| M | B | B | B | M | B | 7 |
| M | B | B | M | B | B | 8 |
| M | B | M | B | B | B | 9 |
| M | M | B | B | B | B | 10 |

The same type of buffer circuit is used for each of these data inputs; accordingly, only the one for the HI(T) data input is specifically described herein. The HI(T) data input is carried by a signal lead 12-1 which is connected to the anode of a diode 71. A resistor 72 is connected between the anode of the diode 71 and the wire 41 to which −48 volts is supplied by the battery 40 (FIG. 1). A resistor 74 is connected betweeen the cathode of the diode 71 and a wire 75 to which −12 volts is supplied by the voltage regulator 42 (FIG. 1). The output, HI(E), of this buffer circuit is defined at the junction of the diode 71 and the resistor 74. When the HI(T) data input is in the make condition, the diode 71 is forward biased thereby driving the HI(E) signal to approximately 0 volts, this representing a binary 1 value. When the HI(T) data input is in the break condition, the diode 71 is reverse biased whereby the resistor 74 acts as a pull-down resistor to cause the HI(E) signal to be approximately −12 volts, this representing a logical 0 value.

The buffer circuit for the control input EN is a conventional single-transistor switching amplifier whose output is the binary-valued signal $\overline{EN}$. This signal assumes its 0 binary value (i.e., −12 volts) when the control input EN is in the make condition; otherwise it assumes its 1 binary value (i.e., 0 volts).

In the preferred embodiment, the circuitry 10 includes a shift register 80 that is an integrated circuit device sold by the Motorola Corporation under the designation 4201. This shift register has eight stages of D-type flip-flops. It has a mode control input P/S, a plurality of parallel data presetting inputs P1 through P8, a serial data input DS, a clock input C, and a pair of outputs Q6 and Q7.

With a logical 1 being applied to its P/S input, the shift register 80 is in its parallel mode. In this mode, circuitry within the shift register inhibits any shifting of data. Instead, each of the flip-flops within the register is preset to a state in accordance with the binary value of the signal applied to a respective one of the presetting inputs P1 through P8. As an example, if the O(E) signal, which is applied to the input P6, is a logical 0 when the $\overline{EN}$ signal, which is applied to the P/S input, is a logical 1, then the sixth stage flip-flop is reset so that the Q6 output is at the 0 logical level. If, alternatively, the 0(E) signal is a logical 1 when the $\overline{EN}$ signal is a logical 1, then the sixth stage flip-flop is set so that the Q6 output is at the 1 logical level. As a shorthand way of expressing this, it is said that Q6 copies P6 when P/S is 1. Similarly, Q7 copies P7 (to which a logical 0 is continuously supplied) when P/S is 1.

With a logical 0 being applied to its P/S input, the shift register 80 is in its shift mode. In this mode, the signals applied to the presetting inputs have no influence on its operation. Instead, its operation is placed under the control of the signals applied to the clock input C and the serial data input DS.

The clock input C receives the CP signal produced by NAND gate 49 (FIG. 1). The DS input is directly connected to the Q6 output. As was described above, the CP signal changes from 0 to 1 to indicate that a revertive pulse has been received, and it thereafter changes back to 0. It is the 0 to 1 transition that causes the shift register 80 to shift.

The operation of the part of the circuitry 10 that has so far been described is as follows. With EN input at break, it is indicated that parallel data concerning a previously dialed digit is to be accepted. In response, the $\overline{EN}$ signal assumes the 1 logical level, thereby placing the shift register 80 in its parallel mode. In circumstances in which the previously dialed digit had a single dial pulse, the data inputs to be accepted are as follows. The 0(T) input is in the make condition, and each of the other data inputs is in the break condition. Accordingly, the eight internal stages of the shift register 80 are preset as follows. The first stage is reset because P1 is connected to −12 volts which represents the 0 logical level. Each of the second through fifth stages is reset because each of the corresponding presetting inputs P2 through P5 has a 0 logical level applied to it from the respective buffer circuit. The sixth stage is set because its corresponding presetting input P6 has a 1 logical level applied to it from the buffer circuit for the 0(T) data input. The seventh and the eighth stages are each reset because P7 and P8 are each connected to −12 volts. As a result of this presetting, Q6 provides a logical 1 level and Q7 provides a logical 0 level. In other words, Q6, as a result of this presetting, becomes a copy of the presetting value of O(E).

After the shift register 80 has been so preset, the EN input changes to its make condition. In response, the $\overline{EN}$ signal assumes its 0 logical level, thereby placing the shift register 80 in its shift mode. Thereafter, incident to the receipt of a revertive pulse, the CP signal changes from 0 to 1, and this causes a stage-to-stage shifting operation. As a result of this, Q7 provides a logical 1 level; that is, it becomes a copy of the presetting value of O(E). With Q7 providing a logical 1 value under these particular circumstances, it is indicated, as will be explained below, that equality has been reached between the number of revertive pulses and the number of dial pulses in the previously dialed digit.

When equality has been reached, a relay-driver transistor 83 is turned on so as to energize the relay coil 19. The normally closed switch 17 is thereby opened and this disconnects the terminating resistor 15 (FIG. 1) so as to open the loop. The terminating central office recognizes this opening of the loop as a signal to stop generating pulses.

The transistor 83 is controlled by a NAND gate 85 which complements a signal X provided to it by a NAND gate 87. Thus, when the X signal equals 0, the relay is de-energized and the switch 17 is in its normally closed position; and, when the X signal equals 1, the relay is energized and the switch 17 is open.

The NAND gate 87 has three inputs. On one of these, it receives a signal $\overline{AV}$ from the $\overline{Q}$ output of a flip-flop 89. On the other two, it receives the outputs of NAND gates 91 and 93 respectively. The NAND gate 91 has two inputs. On one, it receives a signal $\overline{LHI}$ from a latch circuit 95; its other input is connected to the Q7 output of the shift register 80. The NAND gate 93 has three inputs. On one, it receives a signal LHI from the latch circuit 95; on another, it receives a signal HF from the Q output of a flip-flop 97; and its other input is connected to the Q6 output of the shift register 80. It will be appreciated that the following Boolean equation is obtained:

$$X = LHI \cdot Q6 \cdot HF + \overline{LHI} \cdot Q7 + AV$$

That is, X equals 1 whenever LHI, Q6, and HF each equal 1, or whenever $\overline{LHI}$ and Q7 each equal 1, or whenever $\overline{AV}$ equals 0.

The binary values assumed by the LHI and $\overline{LHI}$ signals while the shift register 80 is in the shift mode depend upon the binary value of the HI(E) signal had during the parallel mode. If during the parallel mode ($\overline{EN}$ = 1), the HI(E) signal equaled 1, then the latch circuit 95 is set so that, during the succeeding shift mode ($\overline{EN}$ = 0), the LHI signal equals 1 and the $\overline{LHI}$ equals 0. If, alternatively, during the parallel mode, the HI(E) signal equaled 0, then the latch circuit 95 is reset so that, during the succeeding shift mode, the LHI signal equals 0 and the LHI signal equals 2. In other words, at the same time that the shift register 80 is being preset, LHI becomes a copy of HI(E) and $\overline{LHI}$ becomes a complement of LHI; and, owing to the memory characteristics of the latch circuit, neither LHI nor $\overline{LHI}$ change during the succeeding shift mode.

The binary value of the HF signal equals 1 while the flip-flop 97 is in its set state and equals 0 otherwise. The flip-flop can be set either by applying a logical 1 level to its S input or by applying a logical 1 level to its J input at a time when there is a 0 to 1 transition in the signal applied to its C input. The flip-flop can be reset either by applying a logical 1 to its R input or by applying a logical 1 to its K input at a time when there is a 0 to 1 transition in the signal applied to its C input. The flip-flop 97 has −12 volts (i.e., logical 0) applied to its S input and to its K input. Its J input is connected to the Q6 output of the shift register 80 and its C input is connected by a lead not shown to the NAND gate 49 (FIG. 1) to receive the CP signal.

The $\overline{EN}$ signal is applied to the R input of the flip-flop 97. Accordingly, at the same time that the shift register 80 is being preset (i.e., $\overline{EN}$ = 1), the flip-flop 97 is being reset. The HF signal, therefore, equals 0 until such time as the flip-flop is set.

The binary value of the $\overline{AV}$ signal equals 1 while the flip-flop 89 is in its reset state and equals 0 otherwise. The characteristics of the flip-flop 89 are the same as those of the flip-flop 97. As to the inputs to the flip-flop 89, its J input is connected to ground (i.e., logical 1), both its S and K inputs are connected −12 volts (i.e., logical 1), the CP signal is applied to its C input, and the $\overline{IA}$ signal is applied to its R input.

The $\overline{IA}$ signal is provided by an inverting amplifier buffer circuit as the logical complement of the OE control input. The OE control input goes to make to indicate that the circuitry 10 should be placed in a mode in which it can detect a possible overflow. When the OE control input goes to make, the $\overline{IA}$ signal changes to 0; otherwise, it equals 1. With the $\overline{IA}$ signal equaling 1, the flip-flop 89 is held in its reset state whereby the $\overline{AV}$ signal equals 1.

So as to explain the operation of the circuitry 10, there will now be described the sequence of events that occur when the number of dial pulses in a previously dialed digit equals 10. In this circumstance, the control inputs provided by the circuitry 5 (FIG. 1) initially cause their corresponding buffer circuits to have the following output logical levels. $\overline{IA}$ equals 1, this forcing $\overline{AV}$ to equal 1. $\overline{EN}$ equals 1, this forcing HF to equal 0 and also enabling presetting according to the data inputs. From Table I above, it will be appreciated that the data input buffer circuits will have the following output logical levels. HI(E) and 4(E) each equal 1, and 3(E), 2(E), 1(E), and 0(E) each equal 0.

The latch circuit 95 responds to the 1 logical level of the $\overline{EN}$ signal to sample the HI(E) signal, whereby LHI equals 1 (i.e., it becomes a copy of HI(E)). The shift register 80 responds to the 1 logical level of the $\overline{EN}$ signal to preset each of its eight stages. The presetting here is such that only second stage is set (because 4(E) equals 1), each of the other stages being reset.

At this point in the operation, the X signal equals 0. This is so because Q6 and Q7 each equal 0 and $\overline{AV}$ equals 1.

After the presetting in accordance with the data inputs is completed, the EN control input enters its make condition. In response, the $\overline{EN}$ signal assumes the 0 logical level. This in turn places the shift register 80 in its shift mode. Thereafter, in response to each revertive pulse, the CP signal causes a stage-to-stage shift.

During the first such shift, the following occurs. The first stage which initially was in its reset stage does not change state because, at the time of the 0 to 1 transition in CP, the signal (from Q6) applied to the DS input equals 0. The second stage, which initially was in its set state, is reset incident to the shifting from the first stage. The third stage, which initially was in its reset state, is set incident to the shifting from the second stage. None of the remaining stages change state because each was initially in its reset state and its preceding stage was too. Inasmuch as neither the sixth nor the seventh stages changes state, Q6 and Q7 each remain equal to 0 and X remains equal to 0. The effect of this shift is to transfer by one, the stage which is in the set state.

Succeeding shifts have the same effect so that, upon the completion of the stage-to-stage shift corresponding to the fourth revertive pulse, the sixth stage is in its set state. At this point, Q6 equals 1. X, however, remains equal to 0 because HF still equals 0.

During the fifth shift, the following occurs. The first stage, which until this point was in its reset state, is set because at the time of the 0 to 1 transition in CP, the signal (from Q6) applied to the DS input equals 1. The second through the fifth stage each remain in the reset state. The sixth stage, which was set as a result of the fourth revertive pulse, is reset again. The seventh stage is set incident to the shifting from the sixth stage. The eighth stage remains reset. At this point, Q7 equals 1. X, however, remains equal to 0 because $\overline{LHI}$ equals 0. At the same time that Q6 enables the first stage to be set it also enables flip-flop 97 to be set. Thus at the same time that Q6 switches back to 0, HF switches to 1. HF remains equal to 1 for the remainder of the operation as to this dialed digit.

With the first stage having been set as a result of the fifth shift, succeeding shifts again have the effect of transferring by one the stage which is in the set stage. Accordingly, upon completion of five more shifts (i.e., after the tenth revertive pulse), the sixth stage will again be in the set state. At this point, Q6, HF, and LHI each equal 1. NAND gate 93 decodes this to apply a 0 to NAND gate 97. Therefore, X equals 1, thereby indicating that equality has been reached between the number of revertive pulses and the number of dial pulses in the previously dialed digit.

The sequence of operations that occur when the number of dial pulses is greater than five and less than 10 is substantially the same as the foregoing. The only variations are as to which stage of the shift register that is set during presetting and as to the number of revertive pulses required to enable the flip-flop 97 to be set.

When the number of dial pulses is five or fewer, the HI(E) signal equals 0 during the presetting. Thus, as a result of the sampling by the latch circuit 95, $\overline{LHI}$ equals 0 during the shifting operating. For digits in this range, NAND gate 91 rather than NAND gate 93 performs the decoding function. as soon as a sufficient number of revertive pulses have, incident to stage-to-stage shifts, caused Q6 to provide a 1, NAND gate 93 responds by providing a 0 to NAND gate 87. Therefore, X switches to 1 indicating that equality has been reached.

What is claimed is:

1. In an arrangement for monitoring tip and ring telephone conductors in a sending central office to detect and signal completion of a revertive pulsing operation during which one or more successively occurring revertive pulses transmitted from a terminating central office are serially carried by the tip and ring conductors until equality is reached between the number of such revertive pulses and a registered number, apparatus operative in response to each such revertive pulse to produce a clock pulse suitable to trigger solid state digital circuitry for detecting such equality, the apparatus comprising:

a terminating resistance switchably connected between the tip and ring conductors so as to complete, for the duration of the revertive pulsing operation, a loop for conducting current flowing incident to the revertive pulses;

a diode bridge circuit having a pair of input nodes each being connected to an opposite end of the terminating resistance and a pair of output nodes between which unidirectional current can flow irrespective of the direction of the loop current;

an optical-coupler device comprising an optical-coupler diode and an electrically isolated optical-coupler transistor, the optical-coupler diode being connected in series-circuit relationship between the pair of output nodes so that the revertive pulses cause pulses of unidirectional current to flow through the optical-coupler diode, and the optical-coupler transistor switching from a non-conductive condition to a conductive condition and back in response to each such pulse of current; and a pulse shaping circuit responsive to the cyclical switching of the optical-coupler transistor so as to produce a clock pulse per revertive pulse.

2. Apparatus according to claim 1 wherein the pulse shaping circuit includes noise rejecting circuit means comprising a threshold detecting circuit and a time delay network coupled between the optical-coupler transistor and the threshold detecting circuit.

3. Apparatus according to claim 2 wherein the time delay network includes a capacitor and non-linear circuit element for controllably directing charging current to the capacitor whereby there is developed across the capacitor a voltage that passes the threshold of the threshold detecting circuit.

4. Apparatus according to claim 1 further comprising voltage limiting means connected between the pair of output nodes.

5. Apparatus according to claim 4 wherein the voltage limiting means comprises a series network of diodes.

6. An arrangement for monitoring tip and ring telephone conductors in a sending central office to detect and signal completion of a revertive pulsing operation during which one or more successively occurring revertive pulses transmitted from a terminating central office are serially carried by the tip and ring conductors until equality is reached between the number of such revertive pulses and a registered number, the sending central office having switching circuitry providing to the arrangement digitally encoded inputs in conventional telephone make/break format, a plurality of the inputs indicating in a parallel data code the registered number and a separate one of the inputs indicating when the parallel coded data is available, the arrangement comprising:

a terminating resistance;

controllable switching means for connecting the terminating resistance between the tip and ring conductors so as to complete, for the duration of the revertive pulsing operation, a loop for conducting current flowing incident to the revertive pulses;

current responsive circuit means for producing a clock pulse per revertive pulse, the circuit means including a pulse shaping circuit electrically isolated from the tip and ring conductors and means responsive to current flowing in the loop for coupling a signal to be shaped by the pulse shaping circuit;

a plurality of buffer circuits, each providing a binary valued signal for a respective one of the digitally encoded inputs; and solid state digital circuit means responsive to the binary valued signals and the clock pulses for controlling the switching means so as to open the loop when equality is reached between the number of such revertive pulses and the registered number, the digital circuit means including multi-state register means, means for presetting the register means in accordance with the parallel data when such data is indicated to be available, the register means changing state responsive to each clock pulse, and decoding means responsive to the register means for controlling the switching means.

* * * * *